US00RE37715E

(19) United States
(12) Reissued Patent
Graham

(10) Patent Number: US RE37,715 E
(45) Date of Reissued Patent: May 28, 2002

(54) GARMENT SET HANGER WITH ADJUSTABLE SUPPORT BAR

(75) Inventor: David C. Graham, Annandale, NJ (US)

(73) Assignee: Cam-Tech, L.L.C, Lebanon, NJ (US)

(21) Appl. No.: 09/392,667

(22) Filed: Sep. 9, 1999

Related U.S. Patent Documents

Reissue of:
(64) Patent No.: 5,664,709
Issued: Sep. 9, 1997
Appl. No.: 08/646,134
Filed: May 7, 1996

U.S. Applications:

(63) Continuation-in-part of application No. 08/618,142, filed on Mar. 19, 1996, now abandoned.

(51) Int. Cl.[7] ..... A47G 25/18; A47G 25/14
(52) U.S. Cl. ..... 223/89; 223/94; 223/85
(58) Field of Search ..... 223/89, 94, 85, 223/88, 92; D6/315, 324

(56) References Cited

U.S. PATENT DOCUMENTS

| | | | | | |
|---|---|---|---|---|---|
| 830,874 | A | * | 9/1906 | Bedinger | 223/85 |
| 1,258,476 | A | * | 3/1918 | Severance | 223/89 |
| 1,861,274 | A | * | 5/1932 | Hopkins | 223/37 |
| 1,867,614 | A | | 7/1932 | Cuscaden | |
| 2,250,245 | A | | 7/1941 | Angove | |
| 2,498,373 | A | * | 2/1950 | Marsand | 223/85 |
| 2,653,739 | A | | 9/1953 | Zenk | |
| 2,686,620 | A | | 8/1954 | Waldman | |
| 2,761,599 | A | * | 9/1956 | Lancaser | 223/DIG. 3 |
| 2,771,654 | A | | 11/1956 | Moore | |
| 2,796,206 | A | * | 6/1957 | Schwartz | 223/89 |
| 2,822,967 | A | | 2/1958 | Spitz | |
| 2,886,223 | A | | 5/1959 | Levin | |
| 3,409,191 | A | | 11/1968 | Fuss | |
| 3,584,746 | A | | 6/1971 | Marchman | |
| 3,651,999 | A | | 3/1972 | Fiocca | |
| 3,935,976 | A | | 2/1976 | Mizrach | 223/88 |
| 4,310,096 | A | | 1/1982 | Kohlhepp | |
| 4,334,641 | A | * | 6/1982 | Narcu | 223/94 |
| 4,638,931 | A | | 1/1987 | Rieser | |
| 4,932,571 | A | * | 6/1990 | Blanchard | 223/89 |
| 5,038,979 | A | * | 8/1991 | Traylor | 223/92 |
| 5,074,446 | A | | 12/1991 | Suddath | |
| 5,163,590 | A | | 11/1992 | Lawler | |
| 5,255,831 | A | * | 10/1993 | Bellamy | 223/85 |
| 5,397,037 | A | | 3/1995 | Ozawa | |
| 5,460,302 | A | * | 10/1995 | Foraker | 223/37 |
| 5,526,968 | A | * | 6/1996 | Larson | 223/85 |
| 5,645,200 | A | | 7/1997 | McDowell | |

FOREIGN PATENT DOCUMENTS

| | | |
|---|---|---|
| FR | 2170820 | 9/1973 |

* cited by examiner

*Primary Examiner*—Bibhu Mohanty
(74) *Attorney, Agent, or Firm*—Smith, Gambrell & Russell, LLP

(57) ABSTRACT

A hanger particularly suited for use with garment sets such as a coat and trouser garment set or a coat and skirt garment set. The hanger includes an upper attachment member which is preferably hook shaped for attachment with a closet rod or the like and a main hanger body which is joined with the attachment member and includes an intermediate section and two shoulder sections extending outwardly to opposite sides of the intermediate section so as to support the garment piece that includes shoulders. The invention further includes a pivoting garment holder for the other garment piece in the set. The pivoting garment holder is supported at an upper end by the intermediate section either by an interface section provided at an upper portion of the intermediate section or by a cavity formed in a mid region of the intermediate section. The pivoting garment piece holder also includes an intermediate portion comprised of a pair of side sections or a single, central bar extending down below the upper end of the pivoting holder and supporting a horizontal support portion of the pivoting holder at its bottom. The horizontal support can include a clamping member or tack surface to facilitate attachment of the trousers or skirt.

53 Claims, 8 Drawing Sheets

20
22
24
26
28
34
40
42
44
46
48
50
52
54
56
58
60
62
66
68
70
72
74
76
78
80
82
84
86
88
90
92
94
96
98
100
102
III
III

GARMENT SET HANGER WITH ADJUSTABLE SUPPORT BAR

Matter enclosed in heavy brackets [ ] appears in the original patent but forms no part of this reissue specification; matter printed in italics indicates the additions made by reissue.

CROSS REFERENCE TO RELATED APPLICATIONS

This application is a continuation-in-part of U.S. Ser. No. 08/618,142, filed on Mar. 19, 1996, *abandoned.*

FIELD OF THE INVENTION

This invention relates to a garment set hanger for use with garment sets such as coat/pant or coat/skirt sets, and, more particularly to a garment set hanger with adjustable support bar or holder.

BACKGROUND DISCUSSION

Conventional clothes hangers typically feature a hook member which is attached to a shoulder support portion of the hanger. The hook member is typically designed for attachment to a closet support rod or the like. The shoulder support portion is designed to support a suit jacket or the like and thus includes two outwardly extending and smoothly contoured shoulder support brackets. Extending between the free ends of these brackets is a horizontal support member which is designed to support trousers or a skirt.

This type of clothes hangers is disadvantageous in that the jacket or coat covers the horizontal bar over which the trousers are positioned. Thus, the jacket or coat must first be removed in order to remove the trousers from the bar. Likewise, the jacket or coat cannot be replaced on the hanger until after the trousers have been repositioned on the bar, or else the jacket or coat must be removed before the trousers can be placed in position. This arrangement is obviously disadvantageous in that a person dressing normally puts the trousers on before the jacket or coat, and reverses the sequence when undressing.

U.S. Pat. No. 5,038,979 to Traylor is directed at the same problem associated with the above described conventional clothes hanger. In an effort to overcome this problem, the [Traylot] *Traylor* reference describes a combination clothes hanger which includes a collar portion having shoulder support portions therebelow and a pair of brackets rigidly fixed to the collar and extending horizontally outward from the collar so as to support a support bar between their free ends. While this design overcomes the problem described above with respect to conventional clothes hangers, it introduces new problems such as the introduction of a large spacing requirement which is particularly problematic in many homes and retail locations where closet or storage rack spacing is at a premium. An additional problem lies in the fact that the Traylor design removes the advantage associated with conventional hangers in providing coat to trouser frictional contact (on the same hanger and/or with regard to an adjacent hanger) which helps avoid trouser slippage in many instances and helps avoid wrinkling by facilitating a proper position of the trousers with respect to adjacently supported and contacting garments.

SUMMARY OF THE INVENTION

The present invention is designed to solve the aforementioned problems associated with typical conventional hangers while avoiding introducing new problems such as an excessive amount of space usage. In so doing, the present invention is directed at a hanger that comprises an attachment member and a main hanger body. The main hanger body includes an intermediate section and first and second shoulder support sections extending in opposite directions out from the intermediate section for supporting a garment piece with shoulder portions. The attachment member is joined with the intermediate section. The hanger also includes a garment piece holder for supporting one other garment piece. The garment piece holder is supported by the main body, and the garment piece holder includes a pivoting component which is positionable between a first location wherein the pivoting component is adjacent the shoulder support sections and a second location wherein the pivoting component is further removed from the shoulder support sections.

The pivoting component of the hanger of the present invention is supported by the intermediate section, and the intermediate section includes an interface section which is joined with the attachment unit. The garment piece holder preferably includes a pivot post arrangement supported by and extending to opposite sides of the intermediate section, and the pivot post arrangement is vertically positioned between the shoulder support sections and the attachment member.

In one embodiment, the hanger's pivot post arrangement includes two post sections fixedly secured to the interface section, and the garment piece holder further comprises two side sections extending off from ends of the pivot post sections. The side sections are pivotably joined to the pivot post sections at an upper end thereof. The garment piece holder further comprises a horizontal support section supported by lower ends of the two side sections. The side sections can be formed of wire with each of the upper ends of the side sections including a coil section wrapped about the pivot post sections.

In one preferred arrangement, a first of the side sections has a coil loop bottom end and a second of the side sections has a curved reception portion. The horizontal support section comprises a horizontal bar and a contact wire section, with the contact wire section extending between and being integral with the coil loop bottom end and the curved reception portion. The horizontal bar has a first end fixedly received by the coil loop bottom and a second end adapted for receipt within the curved reception portion.

The side sections are preferably positioned laterally inward of the bottom, free ends of the shoulder sections such that the side sections each include at least a portion that can contact with a front face of the shoulder sections and can pivot further forward and away from the front face when assuming a trouser removal or initial insertion position.

The bottom ends of the side sections can also be positioned such that the ends of the horizontal support section supported by the side sections can contact a front face of the shoulder sections and can pivot further forward and away from the front face.

In one embodiment of the invention, the attachment member includes a hook shaped section and a bulbous bottom end which is fixedly received within a cavity formed in the main hanger body.

A preferred arrangement of the invention features an intermediate section that includes an interface section joined with the attachment member and a neck section positioned vertically between the interface section and the shoulder support sections, and the garment piece holder has an upper portion joined with the interface section, a mid-portion and a lower horizontal support portion joined with the mid-portion such that the lower horizontal support section is positioned below the neck section.

Under the invention, an upper portion of the garment piece holder includes a pivot post integrally joined with the interface section or, alternatively, pivotably joined with the interface section. Also, the attachment member can be integrally joined with the intermediate section (e.g., monolithic plastic body) or secured thereto.

In an alternate embodiment of the invention, the intermediate section includes an interface section that has at least one reception hole which pivotably receives the garment piece holder. The reception hole is a throughhole in one embodiment which extends through the interface section, and the upper support bar of the garment piece holder extends through the throughhole. With this arrangement, the garment piece holder is preferably a closed loop member having two side sections extending off from a respective end of the upper support bar. The closed loop member further comprises a lower horizontal support bar joined with the lower ends of the side sections. One embodiment of the invention includes a hanger that has means for laterally locking the upper support bar within the throughhole so as to avoid side shifting of the upper support bar.

The hanger of the invention also features in one embodiment a position pivot locking means for releasably locking the garment piece holder at the second location and/or the first location.

In an alternate embodiment of the invention, the garment piece holder includes an upper portion formed of a left insertion section and a right insertion section each having a free end pivotably supported by the interface section. The left and right insertion sections preferably include means for laterally locking the left and right insertion sections in reception holes provided in the interface section.

Thus, in one embodiment of the invention, there is featured a garment piece holder that has an upper portion pivotably joined with the intermediate section, two side sections extending downwardly from the upper portion and between free ends of the shoulder sections, and a lower support section which is joined with a lower end of the side sections. The lower support section includes an essentially horizontal portion upon which the one other garment piece is supported. The lower support section can include a horizontal bar and two, laterally spaced clamps supported on the horizontal bar.

The hanger of the present invention also features a garment piece holder that has a vertically extending central bar with an upper end pivotably received within a recess formed in the intermediate section and a lower end, with the lower end of the central bar supporting a member for supporting the one other garment piece.

Stated in other words, the present invention is directed at a hanger which has a main hanger body that includes an intermediate section joined with the attachment member and first and second shoulder support sections extending in opposite directions out from the intermediate section for supporting a garment piece with shoulder portions. The hanger also includes a garment piece holder for holding one other garment piece, the garment piece holder having an upper portion pivotably joined with the intermediate section, an intermediate portion extending down from the upper portion of the garment piece holder, and a lower portion with means for contacting and supporting the one other garment piece.

The intermediate section includes an interface section and the garment piece holder can include a pivot post secured to the interface section as well as an intermediate portion that includes two side sections. The side sections and the lower portion are formed of a continuous length of wire having coiled upper ends pivotably received by the pivot post.

Alternatively, the upper portion includes an uninterrupted, essentially horizontal bar extending through a throughhole formed in the interface section. As an additional alternative embodiment, the hanger's upper portion can include a head member that is pivotably received within a cavity formed in the intermediate section, and the intermediate portion can include a centrally positioned arched bar extending down from the upper portion to a horizontal holder member.

The invention is also directed at a method of manufacturing a hanger which includes the step of forming a main hanger body which includes an intermediate section and two shoulder sections extending out from the intermediate section for supporting a first garment piece. The method also includes forming a garment piece holder for holding one other garment piece, the garment piece holder including an upper portion, at least one intermediate portion pivotably supported by the main body of the hanger, and a lower portion, which lower portion provides means for contacting and supporting the one other garment piece.

BRIEF DESCRIPTION OF THE PREFERRED EMBODIMENTS

The advantageous aspects of the invention will be more fully appreciated from the following description, particularly when considered in conjunction with the attached drawings, wherein.

DETAILED DESCRIPTION OF THE PREFERRED EMBODIMENTS

FIGS. 1–7 illustrate the structure and operation of a first embodiment of the present invention's garment set hanger 20.

As shown in these figures, hanger 20 is comprised of upper attachment member 22, first garment piece pivot holder assembly 24 and second garment piece support section 26.

Figure 1:
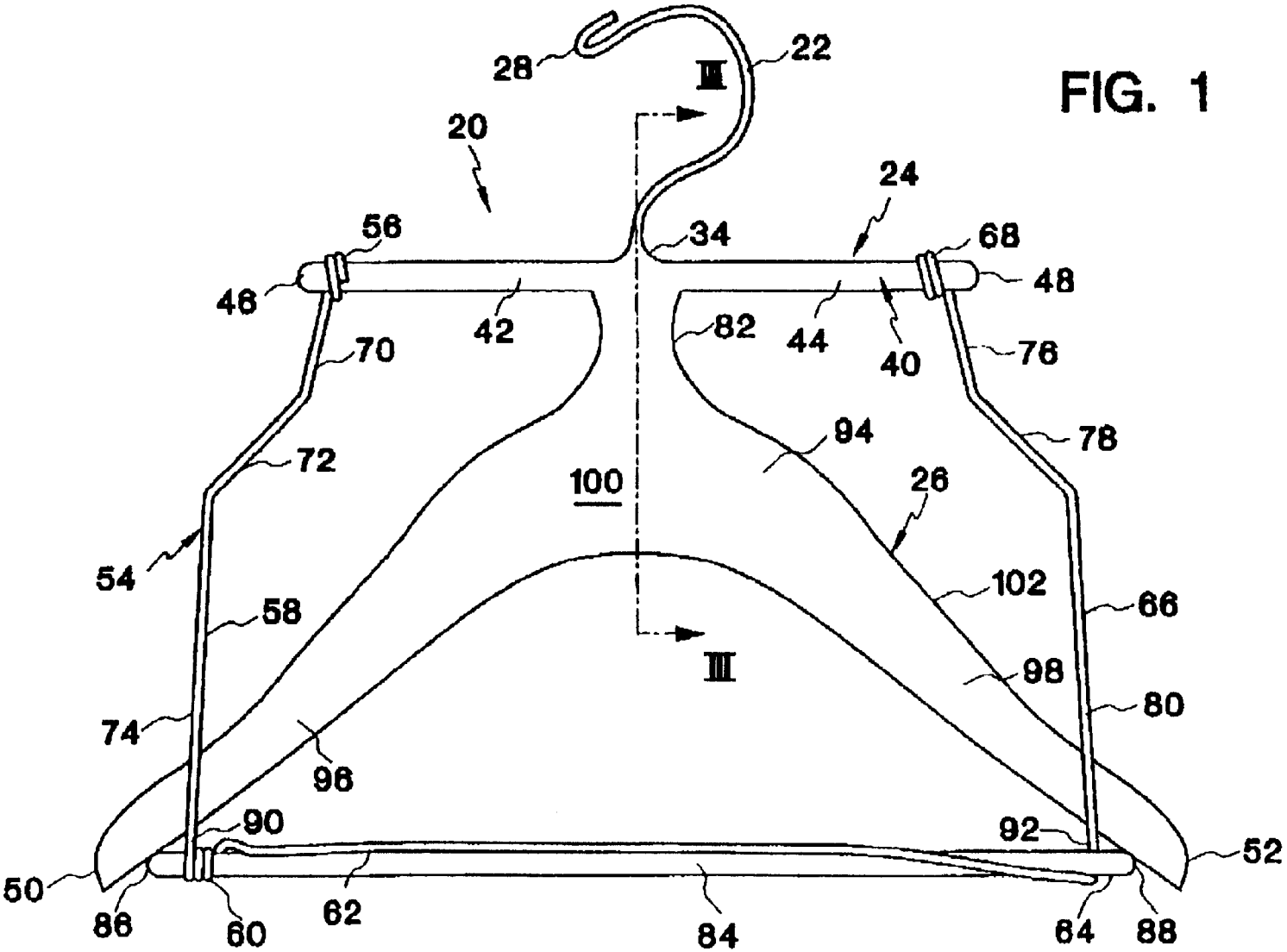
FIG. 1 shows a front elevational view of a preferred embodiment of the present invention.
Figure 3:
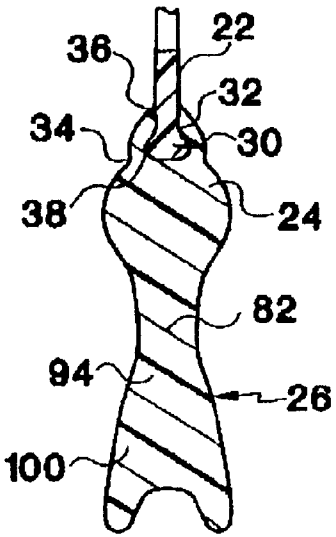
FIG. 3 shows a cross-sectional view taken along cross-section line III—III in FIG. 1.

With reference now to FIGS. 1 and 3, upper attachment member 22 is formed as a hook shaped metallic member with curved free end 28 and bulbous base 30 (FIG. 3). Bulbous base 30 is received within cavity 32 formed in engagement interface section 34 of hanger 20. Cavity 32 is comprised of a cylindrical opening 36 which opens out into bulbous portion 38.

Bulbous base 30 of upper attachment member 22 can thus be snap inserted into cavity 32 for detainment therein with or without the help of additional securement means such as an adhesive or a key/slot arrangement. Also, the base end 30 of upper attachment member 32 can be covered during a molding process when engagement interface section 34 is formed of a plastic material as represented in FIG. 3. The upper attachment member 22 illustrated in FIG. 1 is one of many possible variations intended to be covered under the present invention. For example, rather than a metallic upper attachment member as shown in FIG. 1, a plastic hook shaped attachment member can be formed simultaneously and thus integrally with engagement interface section 34 which would also be formed of the same plastic material. Alternatively, a screw thread arrangement or cylindrical cavity with adhesive could also be relied upon when the upper attachment member is formed independently of the engagement interface section 34. Also, rather than a hook shaped element, alternatively shaped attachment members can be relied upon such as a straight member with upper bulbous tip which is often found in hotel rooms and the like.

First garment piece pivot holder assembly 24 features pivot post arrangement 40 which includes first pivot post section 42 extending to one side of engagement interface section 34 and second pivot post section 44 extending to the opposite side of engagement interface section 34. Both pivot post sections 42,44 share a common central axis and lie on a horizontal plane. Also, free end 46 and free end 48 of first and second pivot posts 42,44 preferably extend out to an intermediate area between a bisecting vertical plane represented by cross-section line III—III in FIG. 1 and a respective outer extremity 50,52 of second garment piece shoulder support sections 96 and 98. For example, in a preferred embodiment the free ends 46 and 48 would fall within the intermediate range extending from 25% to 75% out from the vertical bisecting plane toward the respective outer extremity. More preferably, that range is 35–55%.

First holder assembly 24 also comprises pivot extension member 54 which, in this particular embodiment, is a wire member that features first coil wrap end 56, first side section 58, coil wrap holder 60, garment contact member 62, reception curve 64, second side section 66 and second coil wrap end 68.

Figure 2:
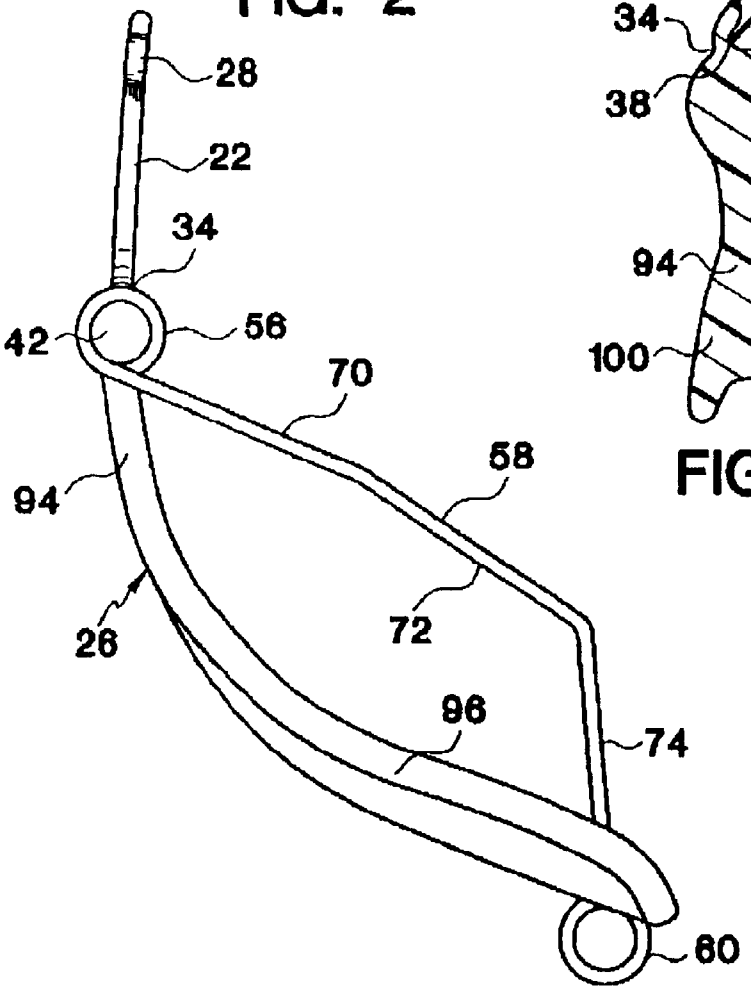
FIG. 2 shows a side elevational view of that which is shown in FIG. 1.

Coil wrap end 56 is wrapped about pivot post section 42 close to free end 46 (e.g., within ⅛ to 2") and is in a sliding friction contact arrangement with pivot post section 42. Similarly, second coil wrap 68 is similarly positioned with respect to free end 48 of second pivot post section 44 and is also slidingly frictionally supported at that end. With reference to FIGS. 1 and 2, first side section 58 includes outwardly and downwardly extending wire portion 70 which extends outwardly down off from coil wrap end 56. First side section 58 also includes wire portion 72 which extends laterally outwardly and downwardly (at a lesser incline than the portion 70) from portion 70. Wire portion 72 extends to wire portion 74 which, in turn, extends essentially vertically off from the end of wire portion 72 to coil wrap holder 60. Second wire side section 66 represents a mirror image of first side section 58 and thus includes outwardly and downwardly extending wire portion 76, laterally outwardly and downwardly extending wire portion 78 and essentially vertically extending wire portion 80 with the latter extending into reception curve 64. While the aforementioned configuration of the wire is preferred, various other configurations can also be relied upon. [For example, with reference to FIG. 2, the second half of portion 70, all of portion 72 and the upper half of 74 can be reconfigured as shown by the dot-dashed lines in FIG. 7.]

Pivot post arrangement 40 is preferably integrally formed with the centered neck section 82 of second garment piece section 26 although, as discussed below, the present invention features other alternatives wherein post 40 or the like is not fixedly secured to neck 82 but able to pivot itself. Second garment piece section 26, attachment member 22 and pivot post arrangement 40 can be molded as an integral plastic body and such molding allows for ready release of the molded product without the need for hydraulic special release dies.

In the embodiment shown in FIG. 1, coil wrap holder 60 frictionally detains in fixed fashion holder bar 84. Holder bar 84 has free ends 86 and 88. Free end 88 is positioned off from the aforementioned vertical bisecting plane represented by cross-section line III—III in FIG. 1 in a range of 75–100% of the total length from that plane to the outward end 52 of second garment piece support section 26, and more preferably 85–95% and most preferably 90%. The opposite free end extends equally to the other side of the bisecting plane.

As shown in FIG. 1, the holder bar 84 is horizontally positioned by pivot extension member 54 and is of a length such that it is able to nestle underneath second garment piece support section 26 which nestling can be facilitated by an inward, minor bend at the interface between wire portion 74 and coil wrap holder 60 (which inward curvature is designated by reference number 90 in FIG. 1). A similar inward bend 92 is provided at the interface of vertical wire portion 80 and reception curve 64 (actually inward bend 92 can represent the initial portion of reception curve 64). Thus, the length of holder bar 84 and the positioning and length of vertical portions 58 and 80 of the pivot extension member 54 provides a pinching arrangement with respect to second garment piece support section 26. Alternatively, the holder bar 84 can be positioned to the front of second garment piece support section 26 anywhere from below neck section 82 to within 3–6 inches below the lowest end of second garment piece support section 26. Also, free ends 86 and 88 can be extended out so as to contact the second garment piece support section 26 rather than portions 74 and 80 of pivot extension member 54 being adapted for contact with shoulder support sections 96 and 98.

Garment contact member 62 extends between coil wrap holder 60 and reception curve 64 and allows one to pinch a first garment piece such as a pair of trousers between bar 84 and garment contact member 62 so as to fix the garment piece in position. For release of the fixed garment piece, free end 88 is lifted up from reception curve 64 until free end 88 of bar 84 can be rotated to the inside of vertical section 80 whereupon the trousers of the first garment piece can be slid off the bar.

The second garment piece, such as a coat or jacket, is supported by second garment piece support section 26 of hanger 20. Second garment piece support section 26 includes the aforementioned neck section 82 which is integrally formed with main body 94 of second garment piece support section 26. Main body 94 is preferably formed of plastic material which, in this embodiment, is integrally molded with neck portion 82 as well as pivot post 40. Alternatively, a wood hanger can be formed with different components adhered together. Main body 94 includes first shoulder support section 96 and second shoulder support section 98. First and second shoulder support sections 96,98 extend downwardly and forwardly from mid-section 100. Thus, the intermediate section of the second garment piece support section includes interface section 34, neck 82 and mid-section 100. The forward extension or curvature of support sections 96 and 98 facilitate the pinching action that occurs between them and pivot extension member 54. Main body 94 also features a smoothly curved upper surface 102 and a bottom material saving recess 104.

Figure 4:
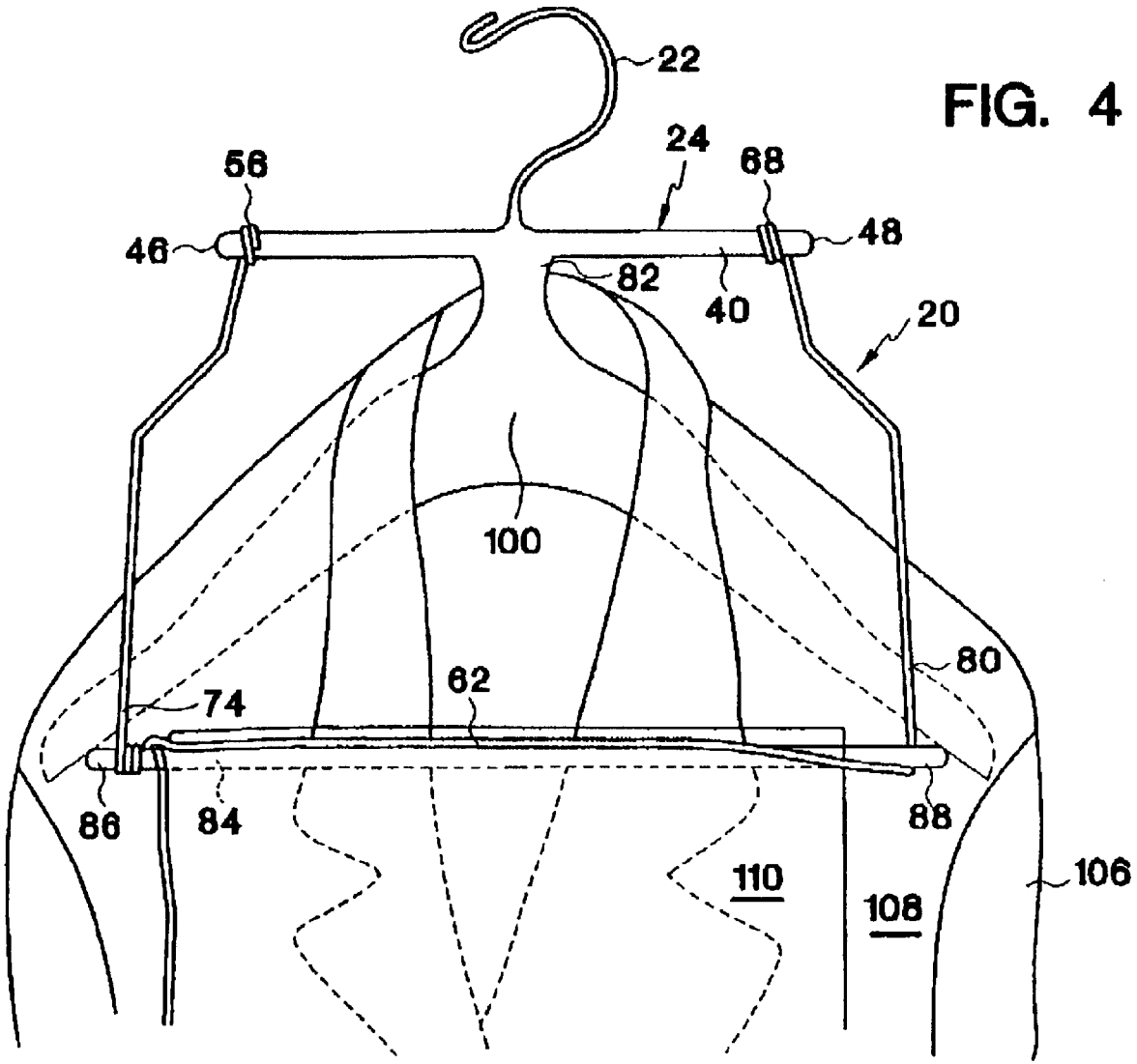
FIG. 4 shows a front elevational view of the embodiment of FIG. 1 supporting a garment set.

With reference now to FIGS. 1–7 and particularly FIGS. 4–7, a description of the operation of the apparatus above described is provided. As illustrated in FIG. 4, coat or jacket 106 is supported on shoulder support sections 96 and 98 of second garment piece support section 26. Positioned in front of the front face 108 of coat or suit 106 is the first garment piece 110 which in this illustration is represented by pants. Pants 110 are supported on the essentially horizontally positioned support bar 84 and clipped in place by way of garment contact member 62.

In the position shown in FIG. 4, first garment piece holder assembly 24 is in a fully loaded, ready to position in a closet, position. In this ready to hang position, trousers or pants 110 are in contact with front face 108 of coat 106. Similarly, free ends 86 and 88 and/or vertical portions 74 and 80 are also in contact with the front face 108 of coat 106. With this arrangement, the pants are maintained in a flattened arrangement and the front face 108 of coat 106 is also retained in the position the front face assumes during wearing of the coat. Accordingly, the problems of pants wrinkling and, especially, front face wrinkling due to front-face twisting or folding of coat 108 is reduced.

Figure 5:
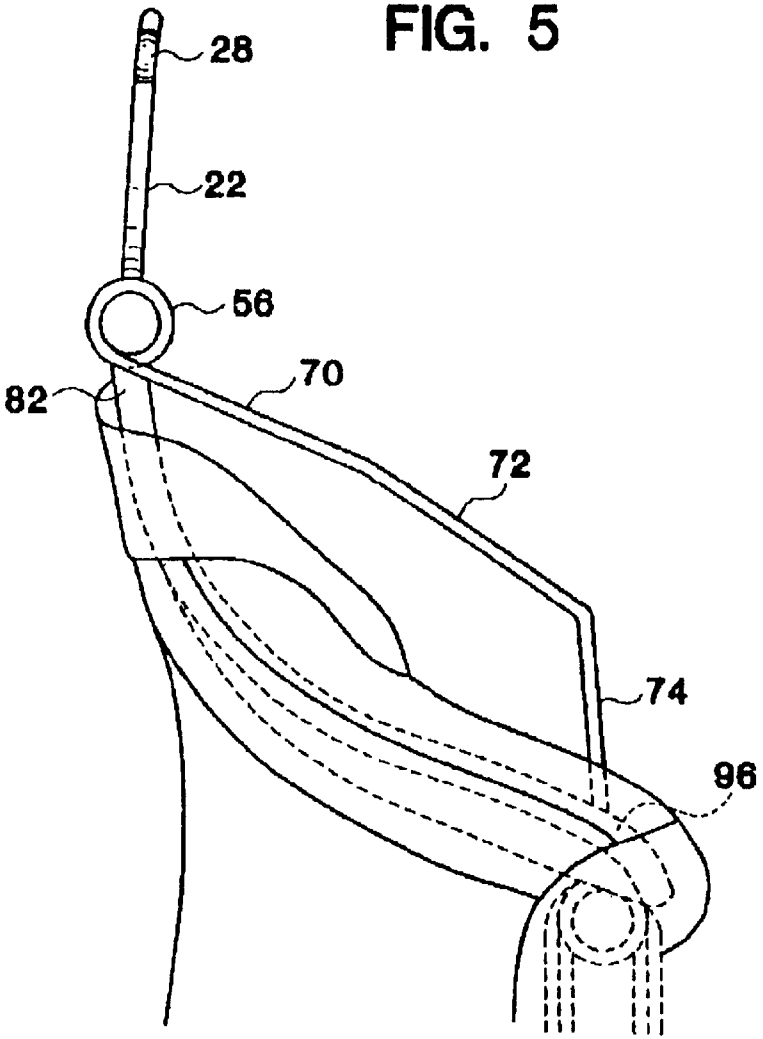
FIG. 5 shows a side elevational view of that which is shown in FIG. 4.

FIG. 5 illustrates a side elevational view of that which is shown in FIG. 4 wherein the front extension and curving of first shoulder support section and second shoulder support section 96, 98 is shown. FIG. 5 also shows the side view contour of wire portion 70, 72 and 74 and designates the ready to hang position as position P1.

Figure 6:
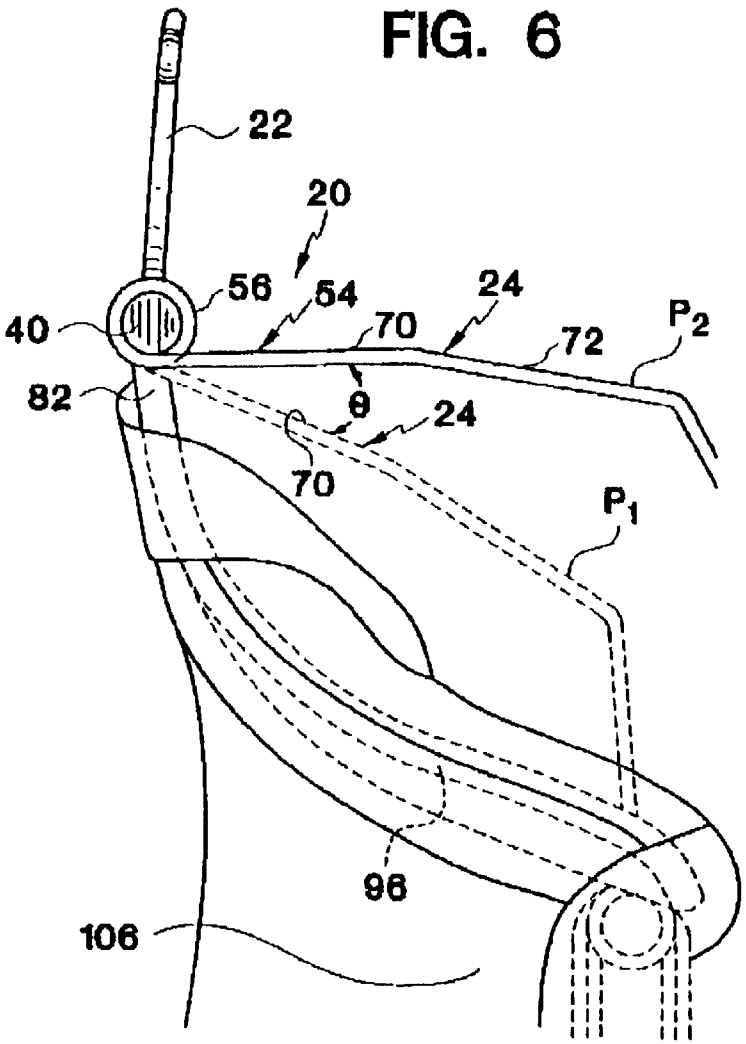
FIG. 6 shows the hanger support element rotated to a removal or initial insertion mode with both pieces of the garment set supported.

FIG. 6 illustrates an initial step in removal of pants 110 from hanger 20 (or, alternatively, a stage just prior to trousers 110 being placed in contact with front face 108 of coat 106 such that the garment set can be hung in a closet or the like). The ready to hang and ready for removal positions are illustrated in FIG. 6 by "P1" and "P2". Thus, P2 in FIG. 6 represents the ready for removal position and P1 shows in dashed line the position holder assembly 24 assumes to achieve contact between the pants 110 and the coat 106.

As shown in FIGS. 1 and 6, coil wrap end 56 of pivot extension member 54 features two or three loops. The outermost loop extends directly into wire portion 70. FIG. 6 also shows a preferred angle spacing between positions P1 and P2. This angle θ is sufficient to provide the necessary clearance between front face 108 of coat 106 and pants 110 whereby pants 110 can be removed from or inserted on holder bar 84 in the aforementioned manner without interference being created by coat 106.

Preferably, there is some degree of friction between pivot post section 42 and coil wrap end 56 so as to at least temporarily maintain the desired spacing θ between P1 and P2. However, since one hand can grasp neck portion 82 or attachment member 22, the other hand can be relied upon to make the necessary adjustments to position holder bar 84 at the desired degree of spacing while also inserting, detaching (when clips are used) or removing the pants or skirt. In an alternate embodiment, not shown, first and second coil warps 56 and 68 can be received within a respective smaller diameter recess formed just inwardly of free ends 46, 48 in post sections 42 and 44 so as to provide added insurance that coils 56 and 68 not change in position or slide off from an end of pivot post arrangement 40. Under this alternative embodiment, coils 56 and 68 would ride within that recess and have their inward and, exterior surfaces close to or in contact with the side walls lining the recesses in pivot post arrangement 40. Also, a biased closed arrangement can be achieved by affixing the free ends of the coils 56 and 58 to post sections 42 and 44. This arrangement provides means for biasing closed pivoting member 54 to position P1 after pants insertion.

Figure 7:
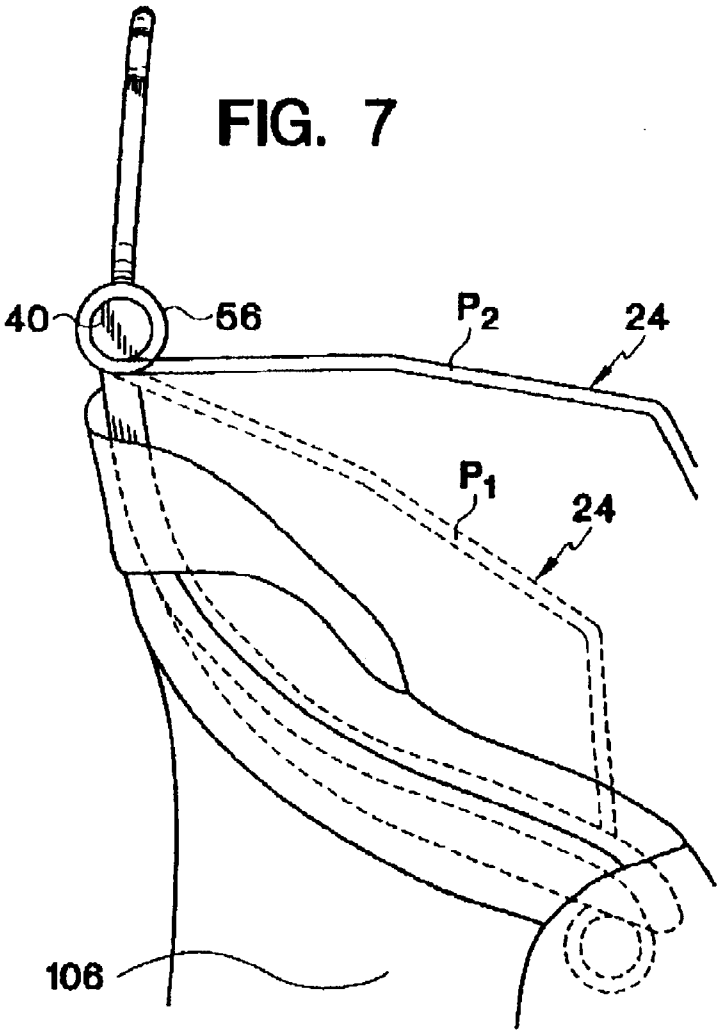
FIG. 7 shows the view of FIG. 6 except with one of two pieces of the garment set removed.

FIG. 7 illustrates the same view as shown in FIG. 6 except for pants 110 having been removed and support bar 84 repositioned in the same position as shown in FIG. 1 (i.e., ready to hang position P1). As can be seen from FIG. 7, the wire configuration and spacing between position P1 and P2 allow for easy removal of the coat after the pants are removed.

Figure 8:
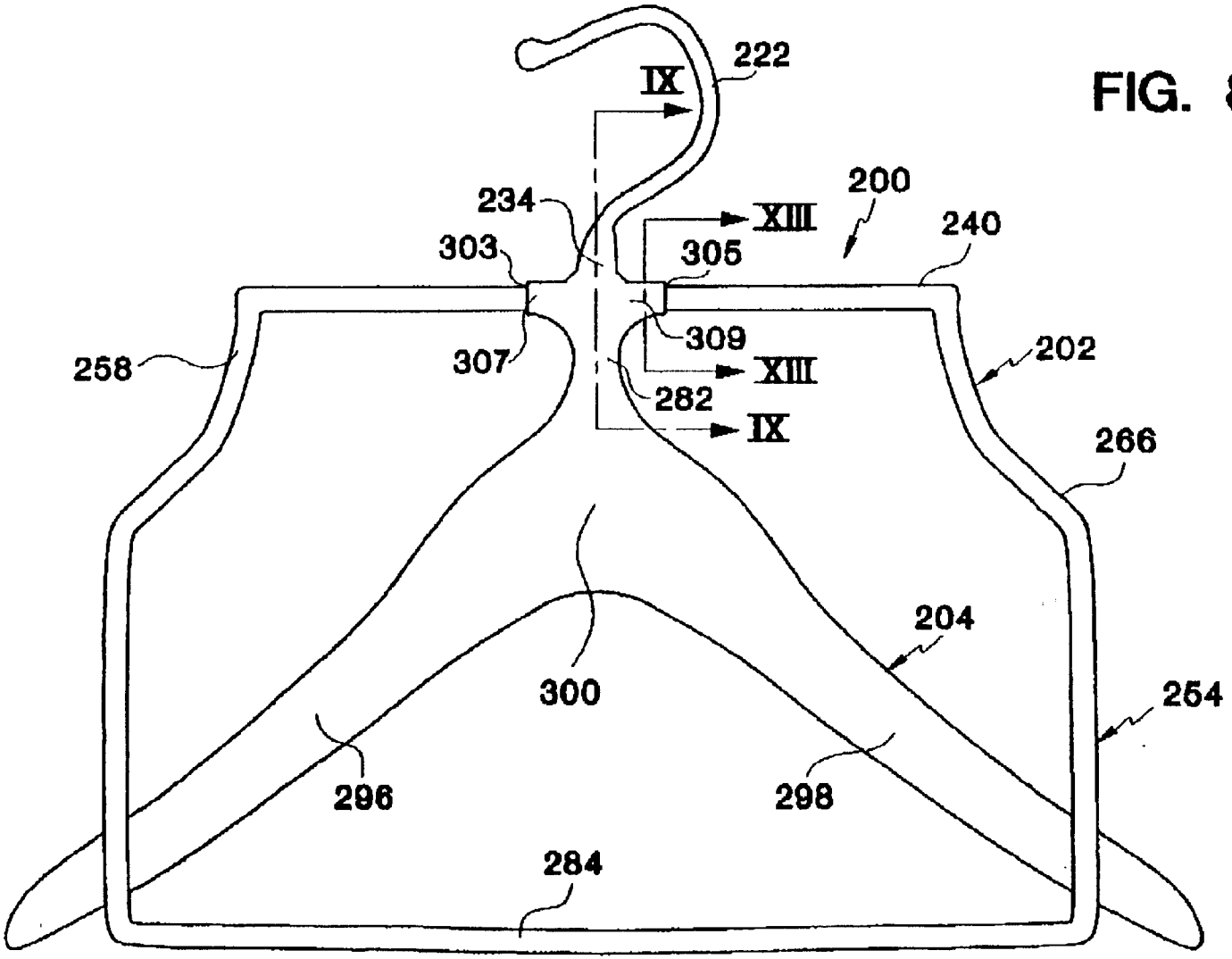
FIG. 8 shows a second preferred embodiment of the present invention in a front elevational view.
Figure 9:
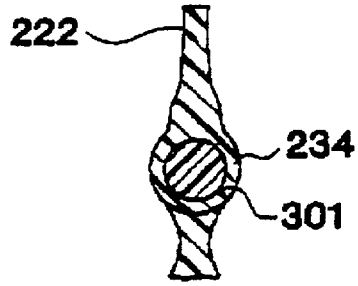
FIG. 9 shows a cross-sectional view taken along cross-section line IX—IX in FIG. 8.

FIGS. 8 and 9 illustrate hanger 200 which represents a second preferred embodiment of the present invention. As shown in FIGS. 8 and 9 hanger 200 is comprised of first component 202 and second component 204 with each component preferably being formed of a plastic material. Preferably, the second component 204 is molded over a previously formed first component 202. In view of this overmolding arrangement, it is preferable that the plastic materials be different for each component with the plastic material of component 202 having a higher melting temperature than that of component 204. Also, different materials can be utilized such as a plastic material for component 204 and a metallic material for component 202.

Hanger 200 features integrally molded attachment unit 222 which extends into engagement interface section 234. Engagement interface section 234 extends down to neck section 282 which, in turn, extends to mid-section 300. To opposite sides of mid-section 300 there is provided first shoulder support section 296 and second shoulder support section 298. The shape of attachment unit 222, mid-section 300, and shoulder support sections 296 and 298 are preferably similarly contoured as that for the above described embodiment shown in FIG. 1.

As shown in FIG. 9, engagement interface section 234 includes cylindrical throughhole 301 which extends between ends 303 and 305 (FIG. 8) and forms the free open ends of arms 307 and 309 of interface section 234. Interface section 234 slidingly receives pivot post 240 of component 202 which component is a single unitary member and thus extends continuously through throughhole 301. This sliding engagement between component 202 and interface section 234 allows for a pivoting action in component 202 to positions similar to P1 and P2 shown in FIG. 6. Thus, as shown in FIG. 8, side sections 258 and 266 of pivot extension member 254, which are integrally joined with post 240, extend in a manner similar to that of side sections 58 and 66 in the FIG. 1 embodiment.

At the lower ends of side sections 258 and 266 there is provided support bar 284 which is horizontally oriented and has ends integrally joined with the bottom ends of side sections 258 and 266. Although not shown, each of the above described embodiments as well as those described below, can include vertically planar shoulder support sections 296 and 298 rather than the forwardly extending brackets illustrated in, for example, FIG. 2. Also, attachment unit 222 could be a separate component which is secured to the upper end of interface section 234.

Rather than the above described overmolding technique for the embodiment of FIG. 8, a similar uninterrupted pivot post 240 can be utilized with a snap-fit, two piece arrangement for component 204. That is, component 204 is formed of a first molded hollow half-shell and a second hollow half shell having the same shape as the first. Each of the halves making up component 204 are joined together along their edges following placement of first component 202 in a slot provided in each half. This arrangement allows for a substantial savings in plastic material, but adds an additional securement step in the manufacturing process (e.g., plastic snaps and/or adhesive on joining edges of the shells). With this embodiment, member 222 can be made as a separate component of the same or different material and fixed in position upon the two halves being secured together.

Figure 13:
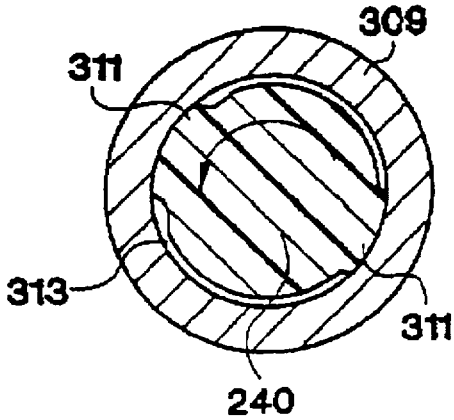
FIG. 13 shows a cross-sectional view in the area of the cross-sectional view of FIG. 10 showing another embodiment of the invention.

Another possible feature of the invention is illustrated in FIG. 13 which represents a cross-sectional view taken along cross-section line XIII—XIII in FIG. 8. As shown in FIG. 13, pivot post 240 features diametrically opposed tabs 311 which are received in a circular groove 313 formed in the interior of wall surface 301. Tabs 311 provide a locking function that prevents pivot post 240 from sliding laterally with respect to throughhole 301 while allowing for the pivot function. A similar lateral slide locking arrangement can also be provided on opposite arm 307. Also, an opposite arrangement can be provided wherein tabs 311 extend inwardly from surface 301 and a circular recess is formed in pivot post 240.

Figure 10:
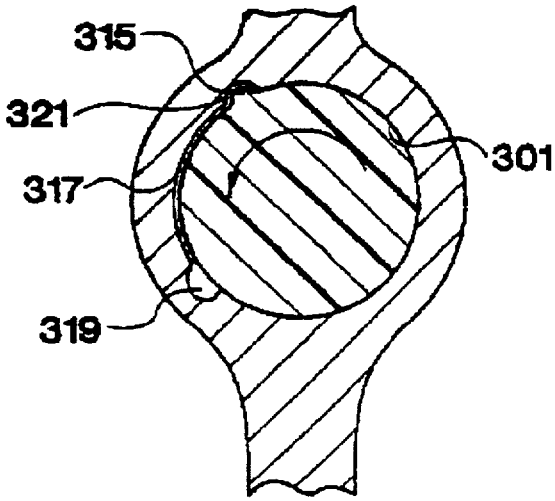
FIG. 10 shows a modified embodiment of the invention along a cross-sectional view similar to that for FIG. 9.

With the arrangement shown in FIG. 8, component 202 is rotated from a garment storage position to a pants/skirt removal (or initial insertion) mode or vice versa. To help in positioning component 202, the desired positions P1 and P2, an arrangement such as that shown in FIG. 10 can be provided. The arrangement shown in FIG. 10 shows pivot post 240 with bulbous protrusion 315 extending radially outward off from pivot post 240. Within the wall surface of throughhole 301 there is provided slot 317 with stop cavities 319 and 321 formed at opposite ends of slot 317. Cavities 319 and 321 extend radially out slightly further than the depth of slot 317 such that bulbous protrusion 315 deforms slightly while travelling in slot 317 and then snaps into position upon coming to one of cavities 319 and 321.

Cavities 319 and 321 are spaced apart by an angle θ such that an operator can rotate pivot extension 254 between a garment storage position P1 and a garment removal (or initial insertion) position P2. The positioning of cavity 319 and protrusion 315 is preferably made such that pivot extension member 254 is in a compressive garment contact state with respect to the interior fold of the pants and the face of the coat or jacket when protrusion 315 is received within cavity 319. The arrangement of FIG. 10 with protrusion 315 riding in slot 317 with cavities 319, 321 can either be provided without the aforementioned tab arrangement(s) shown in FIG. 10 or in addition thereto.

Figure 8A:
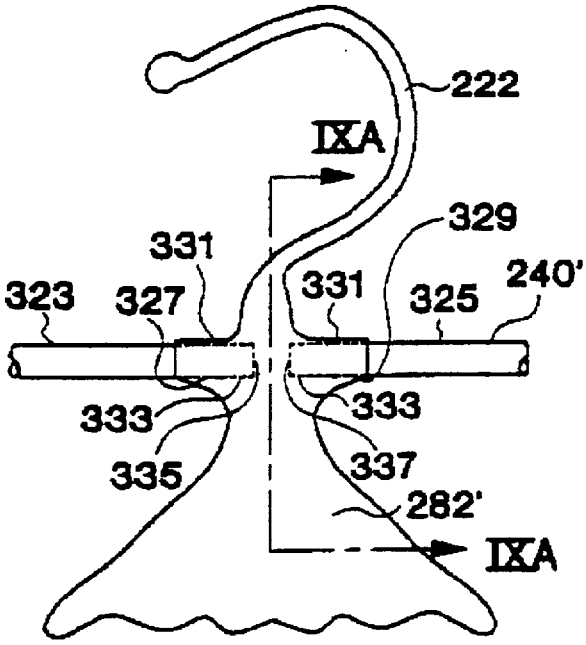
FIG. 8A shows a cut away view of another embodiment of the invention having similarities with that shown in FIG. 8.
Figure 9A:
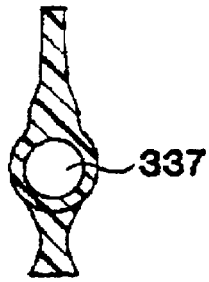
FIG. 9A shows a cross-sectional view taken along cross-sectional line IXA—IXA in FIG. 8A.

FIGS. 8A and 9A illustrate another preferred embodiment of the present invention. The design of the embodiment shown in FIG. 8A is essentially the same as that shown in FIG. 8 except for the area in FIG. 8 in the vicinity of engagement interface section 234 and pivot post 240. As shown in FIG. 8A, pivot post 240' features first insertion end 323 and second insertion end 325 which are received in reception holes 327 and 329 in a friction sliding arrangement. Also, a low height ringed protrusion 331 and a corresponding ringed recess 333 are provided for avoiding lateral shifting of ends 323 and 325 once inserted into reception holes 327 and 329. The ringed protrusions 331 and ringed recesses 333 are formed on insertion ends 323 and 325 such that each can be snap fitted into a corresponding one of reception holes 327 and 329.

The embodiment shown in FIGS. 8A and 9A can also be formed without the snap fitting ringed protrusions 331 and recesses 333 as there is an inherent tendency in pivot post 240' to bring the free ends 335 and 337 back together into an abutting relationship.

An advantage of the embodiment shown in FIGS. 8A and 9A is that any type of material can be relied upon including a common plastic material for each component as each component can be independently formed and then later joined together.

Figure 11:
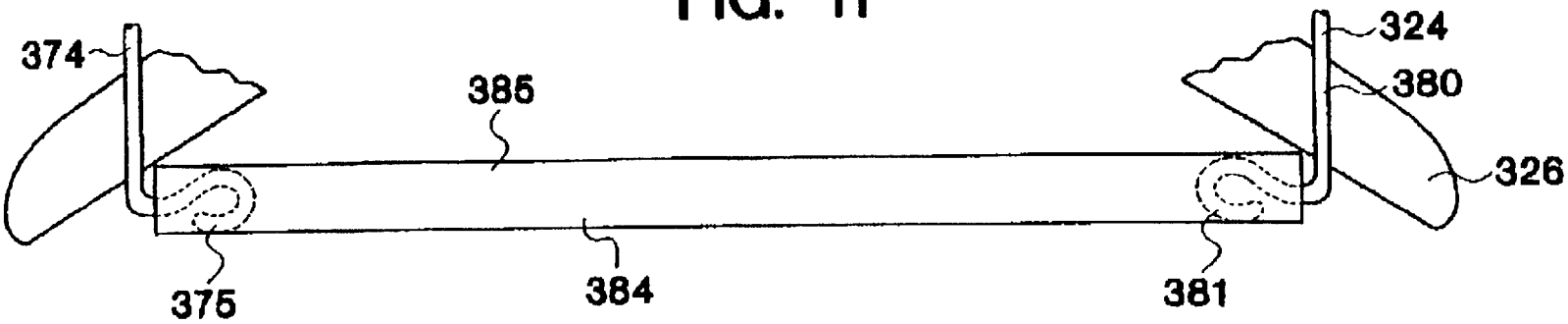
FIG. 11 shows a cut-away view of a bottom portion of another preferred embodiment of the present invention.
Figure 12:
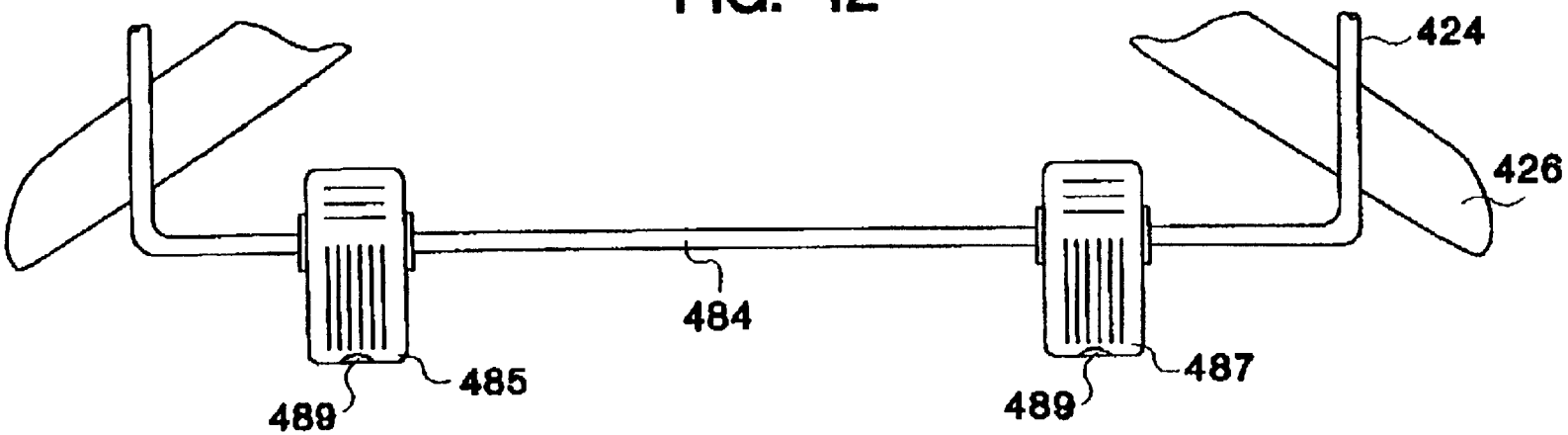
FIG. 12 shows a cut-away view of a bottom portion of still another preferred embodiment of the present invention.

FIGS. 11 and 12 illustrate, in cut-away fashion, two further embodiments of the present invention. The hanger of FIG. 11 has a second garment piece holder section 326 which is similar to that described above. Also, first holder section 324 has an arrangement similar to holder assembly 24 of FIG. 1 except that, in place of support bar 84, coil 60, contact wire portion 62 and recess 64, the lower end of vertical sections 375 and 380 are each provided with a looped end 375 and 381, respectively. Looped ends 375 and 381 are inserted into the open ends of tubular member 384 which preferably is a cardboard tube that can be provided with a tacky outer surface 385 as illustrated in FIG. 11. Tubular member 384 thus represents a trouser holder bar for the embodiment of FIG. 11.

First holder section 324 can also have an arrangement such as that illustrated in FIGS. 8 and 8A. For example, rather than a wire body, first holder section 324 in FIG. 11 can be a single plastic molded member (like that of FIG. 8) with two looped, spaced ends as shown in FIG. 11 or two separate plastic side members having an upper end arrangement like that in FIG. 8A and the two looped ends shown in FIG. 11. Also, two separate wire arrangements can be utilized having looped ends as shown in FIG. 11 and respective bulbous upper ends received within a receiving cavity provided in a respective one of the interface member's arms 307 and 309. The bulbous upper ends and receiving cavities can take on an arrangement similar to that shown in FIG. 3 for joining attachment unit 22 to interface section 34. A bulbous end/reception cavity of this sort would allow for the pivot motion while maintaining the proper lateral positioning of each of the hanger's components.

FIG. 12 illustrates another embodiment having horizontal support bar 484 which supports spring biased clamps 485 and 487 which are preferably fixedly secured to bar 484 at a preferred spacing (e.g., a friction fit throughhole which receives bar 484 therethrough or other means for securement). Clamps 485 and 487 are preferably Spring biased closed and have smoothly contoured inserts (e.g., nylon cylinders) 489 at a grasping end so as not to damage the garment being grasped. This embodiment of the invention is particularly suited for holding a skirt of a suit set together with the suit's coat or a pair of pants with matching suit coat. The upper portion of first garment holder 424 can take on a variety of forms which allow for pivoted repositioning such as those described above.

Figure 14:
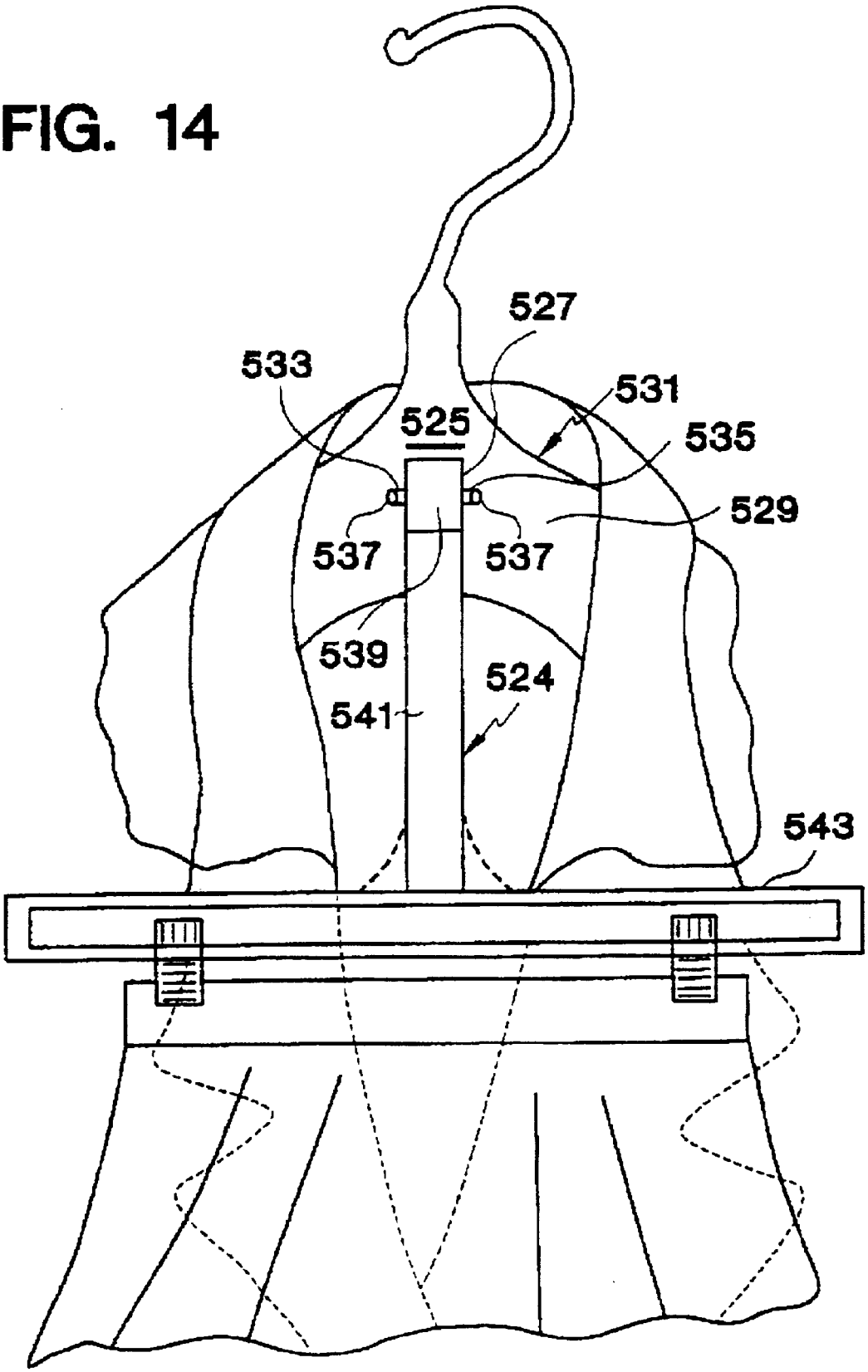
FIG. 14 shows a front elevational, cut away view of yet another embodiment of the present invention.

FIG. 14 shows another embodiment of the invention wherein pivoting first garment piece holder 524 is pivotably received within recess 527 formed in intermediate section 525 of main body 529 of second (shoulder) garment piece support holder 531. Recess 525 includes lateral reception walls 533 and 535 positioned on opposite side walls of the walls defining recess 527 in intermediate section 525. Protrusions 537 extend outwardly from opposite sides of upper portion 539 of first garment piece holder 524. These protrusions can either be snap fitted within holes 533 and 535 or a key slot arrangement can be provided (e.g., a hook shaped slot in each of the side walls defining recess 527 with insertion opening vertically above the lower positioned hook end) or an overmolding process can be utilized for joining the two components as described for FIG. 8. The holes and trunnion like protrusions can also be reversed if desired.

FIG. 14 further shows intermediate portion 541 of first garment piece holder 524 which preferably has a convex arched shape in its side view (not shown). Holder 524 further comprises lower portion 543 which preferably takes on a loop shape (e.g., lower and upper bar sections joined by side sections) as depicted in FIG. 13 for receipt of trousers or the like with or without clamps as described. FIG. 14 also shows an embodiment with clamps supporting a skirt of a garment coat/skirt set. Alternatively, lower portion 543 can take on other arrangements such as a solid bar with only the illustrated clamps or any of the arrangements described above.

Although the present invention has been described with reference to preferred embodiments, the invention is not limited to the details thereof. Various substitutions and modifications will occur to those of ordinary skill in the art, and all such substitutions and modifications are intended to fall within the spirit and scope of the invention as defined in the appended claims. For a few examples of possible modifications, the horizontal support member can be provided with a wood slack holder spool and the main body, and particularly the shoulder sections, can be formed in a variety of different ways (e.g., deluxe round shoulders).

What is claimed is:

1. A hanger, comprising:

an attachment member;

a main hanger body which includes an intermediate section and first and second shoulder support sections extending in opposite directions out from said intermediate section for supporting a first garment piece with shoulder portions, and said attachment member being joined with said intermediate section *and said shoulder support extensions extend forwardly with respect to said intermediate section*;

a garment piece holder for supporting a second garment piece, said garment piece holder being supported by said main hanger body, and said garment piece holder including a pivoting component which includes a lower second garment piece support member, said pivoting component being pivotable with respect to said main hanger body such that said garment piece holder is positionable between a first location wherein said pivoting component is adjacent said shoulder support sections and a second location wherein said pivoting component is further removed from said shoulder support sections, and said lower second garment piece support member is positioned with respect to said main hanger body so as to travel downward in going from said second location to said first location, and when said garment piece holder is in said first location, said support member is not positioned lower than six inches below a lower end of said shoulder support sections.

2. A hanger as recited in claim 1 wherein said intermediate section includes an interface section which is joined with said attachment member, and said garment piece holder includes a pivot post arrangement supported by and extending to opposite sides of said intermediate section, and said pivot post arrangement being vertically positioned between said shoulder support sections and said attachment member.

3. A hanger as recited in claim 2 wherein said pivot post arrangement includes two post sections fixedly secured to said interface section, and said garment piece holder further comprising two side sections extending off from ends of said pivot post sections, said side sections being pivotably joined to said pivot post sections at an upper end of said side sections and said lower second garment piece support member comprises a horizontal support section supported by lower ends of said two side sections, and said side sections each including a curved section which extends outward from a plane vertically bisecting said pivot post sections and said intermediate section.

4. A hanger as recited in claim 3 wherein said side sections are formed of wire and each of the upper ends of said side sections includes a coil section wrapped about said pivot post sections.

5. A hanger as recited in claim 1 wherein said garment piece holder comprises two side sections with a first of said side sections having a coil loop bottom end and a second of said side sections having a curved reception portion, and said lower second garment piece support member including a horizontal support section comprising a horizontal bar and a contact wire section, said contact wire section extending between and being integral with said coil loop bottom end and said curved reception portion, and said horizontal bar having a first end fixedly received by said coil loop bottom and a second end adapted for receipt within said curved reception portion.

6. A hanger as recited in claim 3 wherein said side sections are positioned laterally inward of bottom, free ends of said shoulder sections such that said side sections each include at least a portion that can contact with a front face of said shoulder sections and can pivot further forward and away from said front face when in said second location, and said lower support member being positioned at a vertical level above the lower ends of said support sections when in said first location.

7. A hanger as recited in claim 1 wherein said pivoting component of said garment piece holder includes an upper pivot end and an intermediate portion extending between said upper pivot end and said lower second garment piece support member, and said lower second garment piece support member includes an horizontal support section supported by said intermediate portion, and said horizontal support section is positioned such that it can contact a front face of said shoulder sections and can pivot further forward and away from said front face.

8. A hanger as recited in claim 1 further comprising means for biasing said garment piece holder to said first location.

9. A hanger as recited in claim 1 wherein said garment piece holder includes a pivot post arrangement and side sections spaced apart on said pivot post arrangement to opposite sides of said intermediate section with a spacing which is less than a spacing between free ends of said shoulder sections, and said lower second garment piece support member includes a horizontal support member that lies at a vertical level falling between said attachment member and a lower end of said shoulder support sections.

10. A hanger as recited in claim 1 wherein said intermediate section includes an interface section joined with said attachment member and a neck section positioned vertically between said interface section and said shoulder support sections, and said garment piece holder having an upper portion joined with said interface section, a mid-portion joined with a lower horizontal support portion of said lower second garment piece support member which is joined with the mid-portion such that said lower horizontal support section is positionable below said neck section and above the lower end of said shoulder support sections when in said first location.

11. A hanger as recited in claim 1 wherein said main hanger body includes an interface section positioned vertically between said attachment member and said shoulder sections, and an upper portion of said garment piece holder includes a pivot post integrally joined with said interface section.

12. A hanger as recited in claim 1, wherein an upper portion of said garment piece holder is pivotably joined with an interface section at a reception cavity formed in a mid-region of said intermediate section below said attachment member.

13. A hanger as recited in claim 1 wherein an upper portion of said garment piece holder includes a pivot post integrally joined with said intermediate section and said attachment member being integrally joined with said intermediate section such that said pivot post, attachment member and intermediate section form a monolithic unit of a common material.

14. A hanger as recited in claim 1 wherein said intermediate section includes an interface section, and said interface section further including at least one reception hole which pivotably receives said garment piece holder.

15. A hanger as recited in claim 14 wherein said reception hole is a throughhole extending through said interface section, and said garment piece holder comprises an upper support bar which extends through said throughhole.

16. A hanger as recited in claim 15 wherein said garment piece holder is a closed loop member having two side sections extending off from a respective end of said upper support bar, and said closed loop member further comprising a lower horizontal support bar joined with lower ends of said side sections.

17. A hanger as recited in claim 16 wherein said hanger includes means for laterally locking said upper support bar within said throughhole so as to prevent side shifting of said upper support bar within said throughhole while still providing for pivoting of said upper support bar within said throughhole.

18. A hanger as recited in claim 1 further comprising position pivot locking means for releasably locking said garment piece holder at one or both of said first and second locations, said pivot locking means including a bulbous member formed in one of said main hanger body and said garment piece holder and a reception groove with reception hole for locking receipt of the bulbous member formed in an opposite of said garment piece holder and main hanger body.

19. A hanger as recited in claim 1 wherein said intermediate section includes an interface section and said garment piece holder includes an upper portion formed of a left insertion section and a right insertion section each having a free end pivotably supported by said interface section.

20. A hanger as recited in claim 19 wherein said left and right insertion sections includes means for laterally locking said left and right insertion sections in said interface section to preclude lateral shifting during use.

21. A hanger as recited in claim 1 wherein said garment piece holder has an upper portion pivotably joined with said main hanger body, two side sections extending downwardly from said upper portion and between free ends of said shoulder sections, and said lower second garment piece support member which is joined with a lower end of said side sections, said lower support member including an essentially horizontal portion upon which the one other garment piece is supported, and said horizontal portion having added means supported thereon for releasably retaining said second garment piece in position.

22. A hanger as recited in claim 1 wherein said lower support member includes a horizontal bar and two, laterally spaced clamps supported on said horizontal bar.

23. A hanger as recited in claim 1 wherein said garment piece holder has a vertically extending outwardly arched central bar with an upper end pivotably received within a recess formed in said main hanger body and a lower end, and the lower end of said central bar supporting the lower second garment piece support member, and one of said upper end and said recess formed in said main hanger body including pivot protrusions and an opposite one of said upper end and recess having pivot slots for pivotably supporting said pivot protrusions.

24. A hanger, comprising:

an attachment member;

a main hanger body which includes an intermediate section joined with said attachment member and first and second shoulder support sections extending in opposite directions out from said intermediate section for supporting a first garment piece with shoulder portions;

a garment piece holder for holding a second garment piece, said garment piece holder having an upper portion pivotably joined [with] *within at least one recess formed in* said intermediate section, an intermediate portion extending *forward out away from said intermediate section and* down from said upper portion of said garment piece holder, and a lower portion with means for contacting and supporting the second garment piece; and said lower portion being positioned with respect to said main hanger body such that said lower portion travels downward when said garment piece holder is adjusted from a second garment release position to a first ready to hang position, and said lower portion being positioned such that, when in use in the first position, an upper portion of the second garment piece supported thereon contacts an exterior, vertically intermediate portion of the first garment piece supported on said main hanger body and wherein said lower portion includes a [horizontal support bar] *garment contact* component which, when said lower portion is in a ready to hang position is positioned at a vertical level lying anywhere below said attachment member to six inches below a lower end of shoulder sections.

25. A hanger as recited in claim 24 wherein said intermediate section includes an interface section, and said garment piece holder includes a pivot post secured to said interface section, and said intermediate portion includes two side sections, and said side sections and said lower portion being formed of a continuous length of wire having coiled upper ends pivotably received by said pivot post.

26. A hanger as recited in claim 24 wherein said intermediate section includes an interface section and said upper portion includes an uninterrupted, essentially horizontal bar extending through a throughhole formed in said interface section.

27. A hanger as recited in claim 24 wherein said upper portion includes a head member pivotably received within a cavity formed in said intermediate section.

28. A hanger as recited in claim 24, wherein said shoulder support sections curve both downward along a vertical plane as well as away from the vertical plane so as to bring closer the lower ends of said shoulder support sections.

29. A method of manufacturing a hanger comprising:

[forming] *providing* a main hanger body which includes an intermediate section and two shoulder sections extending out from said intermediate section for supporting a first garment piece;

[forming] *providing* a garment piece holder for holding a second garment piece[,] *such that* said garment piece holder [including] *includes* an upper portion pivotably supported by said main *hanger* body *along a horizontal axis, said garment piece holder further comprising* at least one intermediate portion *which includes a first section that extends forwardly off from said upper portion and a second section which extends less forwardly and more vertically than said first section*, and a lower portion[, which provides means] for contacting and supporting the second garment piece; and *wherein*

[joining said main hanger body and garment piece holder such that;]

said lower portion is positioned with respect to said main hanger body such that said lower portion travels downward when said garment piece holder is adjusted from a second garment release position to a first ready to hang position, and said lower portion further being positioned such that, when in use in the first position, an upper portion of the second garment piece supported thereon contacts an exterior, vertically intermediate portion of the first garment piece supported on said main hanger body, and wherein, when said hanger is in the ready to hand position said lower portion is vertically positioned at or above a level six inches below the lower ends of said [should] *shoulder* support sections.

30. A hanger for a suit combination, comprising:

an attachment member;

a main hanger body which includes an intermediate section and first and second shoulder support sections extending in opposite directions out from said intermediate section for supporting a first jacket component of said suit combination, and said attachment member being joined with said intermediate section;

a garment piece holder for supporting a second component of said suit combination, said garment piece holder being supported by said main hanger body, and said garment piece holder having a horizontal support component for holding an upper end of said second component of the suit combination in a horizontal orientation, and said garment piece holder including a pivoting component which includes said horizontal support component, wherein said horizontal support component is positionable between a first, ready-to-hang location wherein said horizontal support component is adjacent said shoulder support sections to place said first and second components of the suit combination in contact and a second, ready to release or receive location wherein said horizontal support component is further removed from said shoulder support sections, and wherein said horizontal support component represents a lowest-most end of said garment piece holder and said lowest-most positioned horizontal support component is positioned with respect to said main hanger body so as to travel in a downward direction in traveling from said second to said first location*; and*

*wherein said pivoting component includes an upper pivot section pivotably received by said main body in a region above said first and second shoulder sections which pivot section rotates relative to said intermediate section and joined attachment member which remain relatively fixed during pivoting of said pivot section; said pivoting component includes a forward extension section that extends forward out away from said pivot section to provide said pivoting component with a degree of clearance from said main body.*

31. A hanger as recited in claim 30, wherein said horizontal support component includes a support bar and a pair of clamps spaced apart on said support bar.

*32. A hanger as recited in claim 1 wherein said pivoting component includes a pivot section pivotably received by said main body and a second section which extends forwardly out from said pivot section and a third section that extends less forwardly and more downwardly than said second section.*

*33. A hanger as recited in claim 32 wherein the intermediate section of said main hanger body includes a recess for receiving said pivot section which pivots about a horizontal axis lying below and essentially in vertical alignment with respect to said attachment member.*

*34. A hanger is recited in claim 33 wherein said pivot section includes two wire sections extending to opposite sides of said intermediate section.*

*35. A hanger as recited in claim 32 wherein said intermediate section and said pivot section include a locking component which locking component releasably detains said second garment piece holder in said second location.*

*36. A hanger as recited in claim 35 wherein said locking component is internalized within said intermediate section.*

*37. A hanger as recited in claim 1 wherein said garment piece holder has a loop configuration with an upper region of said loop extending generally horizontal and at least partially through an internal region of said intermediate section.*

*38. A hanger as recited in claim 24 wherein said first and second shoulder sections bend forwardly away from said intermediate section.*

*39. A hanger as recited in claim 24 wherein said garment piece holder has a loop configuration with an upper region of said loop including a horizontally extending section which defines a pivot section of said upper portion.*

*40. A hanger as recited in claim 39 wherein said pivot section extends continuously through a throughhole extending through said intermediate section and said intermediate portion includes two sections that extend out from respective ends of said pivot section.*

*41. A hanger as recited in claim 30 wherein said intermediate section includes a locking component positioned internally within said intermediate section so as to releasably detain said garment piece holder in said second garment receive position.*

*42. A method as recited in claim 29 wherein providing said main hanger body includes providing a main hanger body that has shoulder sections extending both downwardly out from said intermediate section and forwardly away from said intermediate section so as to facilitate a pinching arrangement with respect to the lower portion of said garment piece holder.*

*43. A method as recited in claim 29 wherein providing said second garment piece holder includes providing a second garment piece holder that includes a metallic member in a loop configuration with an upper pivot segment that extends horizontally to define a horizontal pivot axis and said upper segment being received internally within said intermediate section following an overmolding process wherein plastic material of said main hanger body is provided over said upper pivot segment.*

*44. A hanger assembly comprising:*

*a main hanger body which comprises an intermediate section and two shoulder sections extending both*

*downwardly and forwardly away from said intermediate section for supporting a first garment piece;*

*a second garment piece holder having an upper section in pivoting engagement with said intermediate section, an intermediate extension, and a lower section for supporting a second garment piece,*

*said upper section being arranged with respect to said intermediate section so as to be received within said intermediate section and so as to extend generally horizontally, and said intermediate extension of said second garment piece holder includes a first segment that extends forwardly out from said intermediate section and a second segment that extends less forwardly and more downwardly then said first segment so as to position the lower section of said second garment piece holder, when in a hang-up state, in a pinching relationship with respect to the first garment piece when supported on said first and second shoulder sections of said main hanger body.*

*45. A hanger assembly as recited in claim 44 further comprising an attachment member fixed to said intermediate section independently of said upper section of said second garment piece holder.*

*46. A hanger assembly as recited in claim 45 wherein said second garment piece holder is loop-configured with an upper horizontal section extending internally and at least partially through said intermediate section of said main hanger body.*

*47. A hanger assembly as recited in claim 44 wherein said upper section includes a horizontally extending extension member and said intermediate section includes two wire segments that extend to opposite sides of said intermediate section and said second segment includes portions that diverge outward together with an outward extension of said shoulder sections away from more internalized contact points defined by the wire segments constituting said first segment of said intermediate extension of said second garment piece holder.*

*48. A hanger, comprising:*

*an attachment member;*

*a main hanger body which includes an intermediate section and first and second shoulder support sections extending in opposite directions out from said intermediate section for supporting a first garment piece with shoulder portions, and said attachment member being joined with said intermediate section;*

*a garment piece holder for supporting a second garment piece, said garment piece holder being supported by said main hanger body, and said garment piece holder including a pivoting component which includes a lower second garment piece support member, said pivoting component being pivotable with respect to said main hanger body such that said garment piece holder is positionable between a first location wherein said pivoting component is adjacent said shoulder support sections and a second location wherein said pivoting component is further removed from said shoulder support sections, and said lower second garment piece support member is positioned with respect to said main hanger body so as to travel downward in going from said second location to said first location, and when said garment holder is in said first location, said support member is not positioned lower than six inches below a lower end of said shoulder support sections;*

*wherein said intermediate section includes an interface section, and said interface section further includes at least one reception hole which pivotably receives said garment piece holder; and*

*wherein said reception hole is a throughhole extending through said interface section, and said garment piece holder comprises an upper support bar which extends through said throughhole; and*

*wherein said lower garment piece support member is dimensioned so as to nest rearward of a portion of said shoulder sections when said garment piece holder is pivoted into contact with said main hanger body.*

*49. A hanger as recited in claim 48 wherein said garment piece holder is a closed loop member having two side sections extending off from a respective end of said upper support bar, and said closed loop member further comprising a lower horizontal support bar joined with lower ends of said side sections.*

*50. A hanger, comprising:*

*an attachment member;*

*a main hanger body which includes an intermediate section joined with said attachment member and first and second shoulder support sections extending in opposite directions out from said intermediate section for supporting a garment piece with shoulder portions;*

*a garment piece holder for holding a second garment piece, said garment piece holder having an upper portion pivotably joined with said intermediate section, an intermediate portion extending down from said upper portion of said garment piece holder, and a lower portion with means for contacting and supporting the second garment piece; and*

*said lower portion being positioned with respect to said main hanger body such that said lower portion travels downward when said garment piece holder is adjusted from a second garment release position to a first ready to hang position, and said lower portion being positioned such that, when in use in the first position, an upper portion of the second garment piece supported thereon contacts an exterior, vertically intermediate portion of the first garment piece supported on said main hanger body and wherein said lower portion includes a horizontal support bar, component which, when said lower portion is in a ready to hang position is positioned at a vertical level lying anywhere below said attachment member to six inches below a lower end of shoulder sections, and*

*wherein said shoulder support sections curve both downward along a vertical plane as well as away from the vertical plane so as to bring closer the lower ends of said shoulder support sections.*

*51. A hanger as recited in claim 30 wherein said attachment member includes an end which is received within said main body in a fixed or non-movable manner.*

*52. A hanger as recited in claim 30 wherein said pivoting component includes a second section that extends less forward and more downward than said forward section, and said shoulder support sections extend downwardly and forwardly relative to said attachment member, and said second section of said pivoting component extending between and less forward than free ends of said shoulder sections when said pivoting component is in abutment with said main body.*

*53. A hanger as recited in claim 48 wherein said attachment member is non-movably fixed to said intermediate section.*

* * * * *